Nov. 25, 1958    H. D. WITZEL    2,861,663
POWER TRANSMISSION MECHANISM AND CONTROL THEREFOR
Original Filed Oct. 22, 1956    3 Sheets-Sheet 1
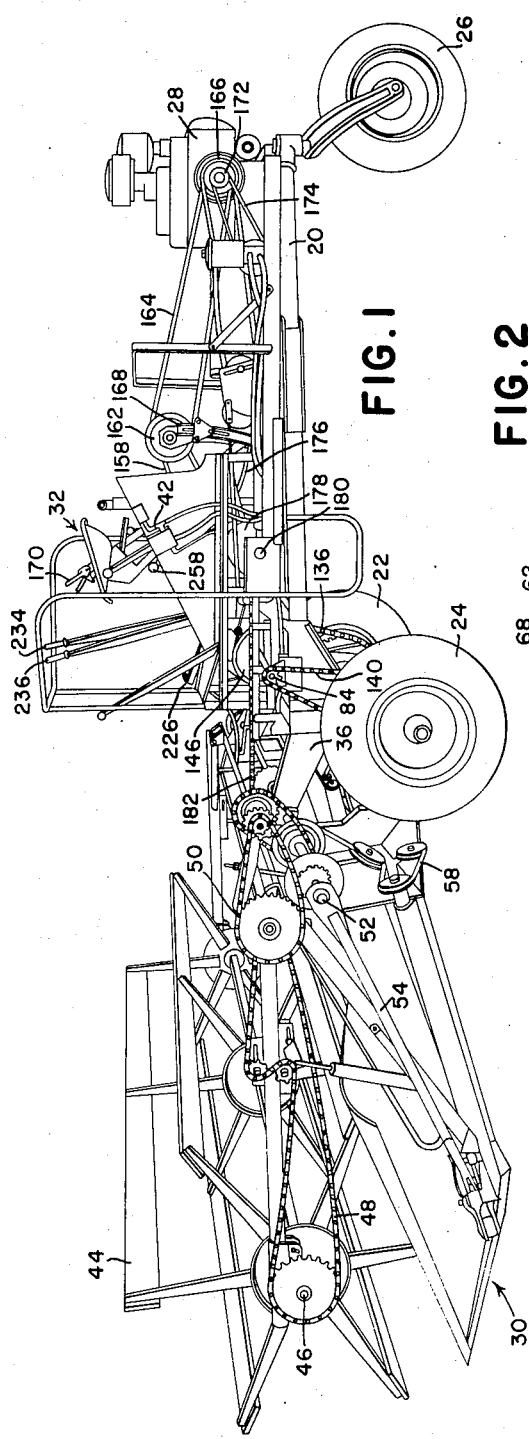
INVENTOR.
H. D. WITZEL Nov. 25, 1958  H. D. WITZEL  2,861,663
POWER TRANSMISSION MECHANISM AND CONTROL THEREFOR
Original Filed Oct. 22, 1956  3 Sheets-Sheet 2
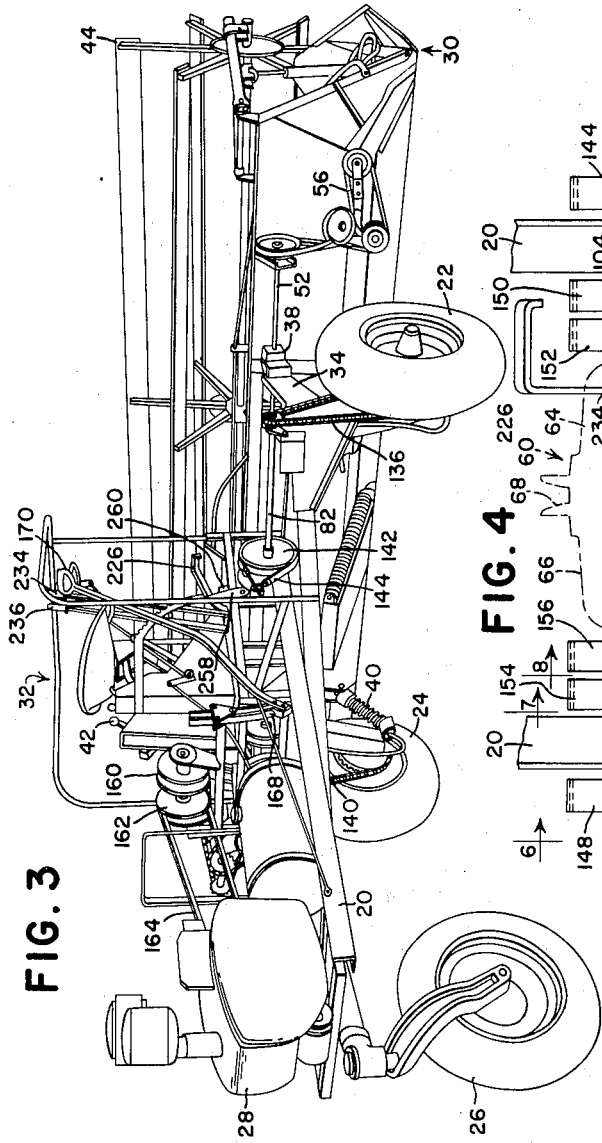
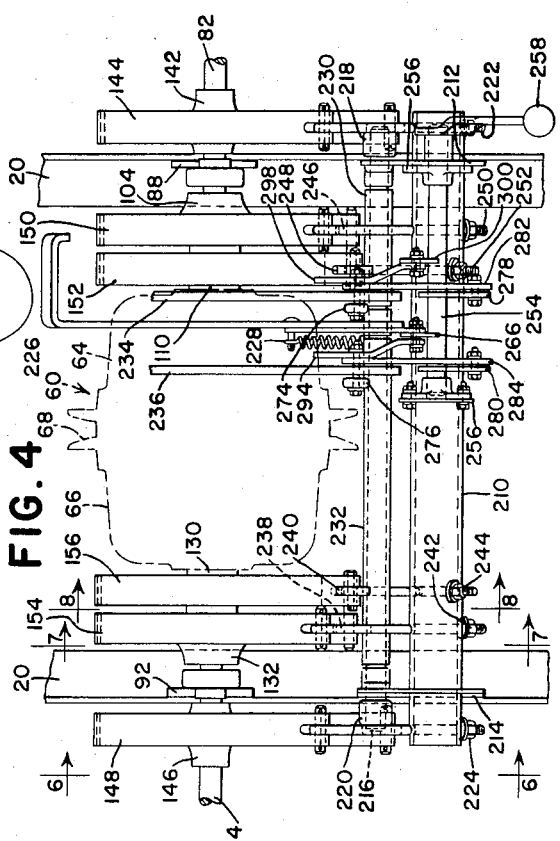
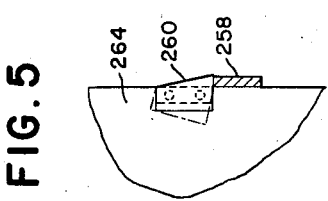
INVENTOR.
H. D. WITZEL Nov. 25, 1958　　　　H. D. WITZEL　　　　2,861,663
POWER TRANSMISSION MECHANISM AND CONTROL THEREFOR
Original Filed Oct. 22, 1956　　　　3 Sheets-Sheet 3
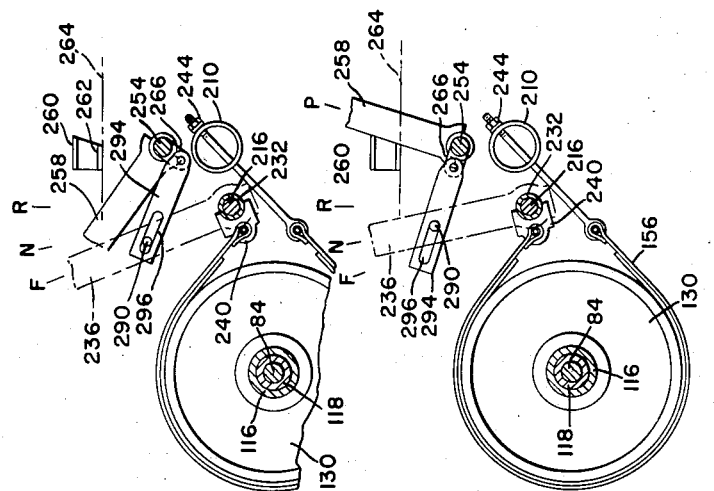
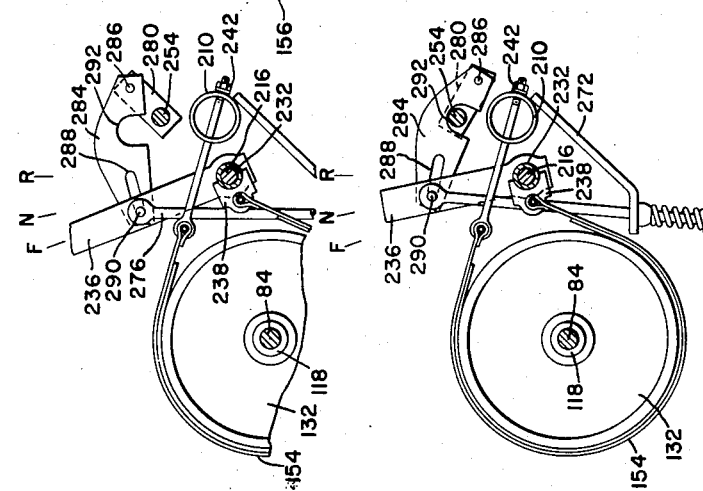
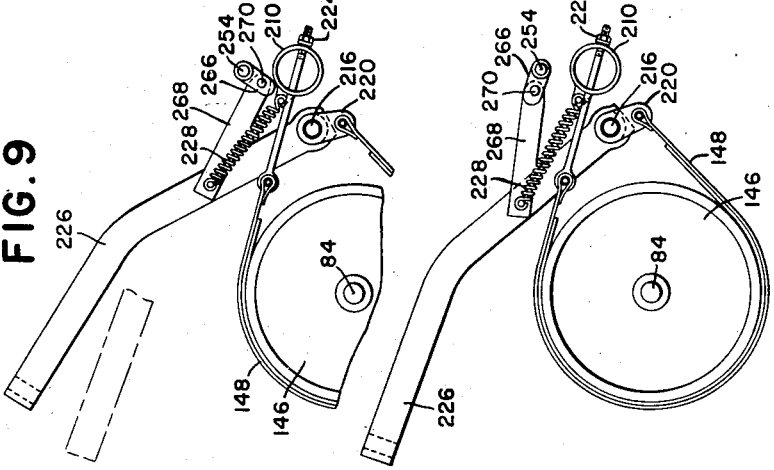
INVENTOR.
H. D. WITZEL United States Patent Office 2,861,663
Patented Nov. 25, 1958

1

2,861,663

POWER TRANSMISSION MECHANISM AND CONTROL THEREFOR

Homer D. Witzel, Bettendorf, Iowa, assignor, by mesne assignments, to Deere & Company, a corporation of Delaware Original application October 22, 1956, Serial No. 617,295. Divided and this application October 28, 1957, Serial No. 692,791

13 Claims. (Cl. 192—4)

This invention relates to the control of power transmitting mechanisms such as those used in vehicles. More particularly, the invention relates to a planetary drive and control means therefor for driving, reversing and steering an agricultural machine of the windrower type. This application is a division of copending application Serial No. 617,295, filed October 22, 1956.

Among the requirements of self-propelled windrowers and similar machines are maneuverability and ease of operation, particularly in connection with the ability of the machine to turn relatively sharp corners. Despite its advantages over drawn windrowers, the self-propelled windrower must be relatively economical and easy to maintain. Various drive and control mechanisms have been tried heretofore and in the main suffer from one short coming or another, due largely to the complications introduced by the steering, driving and reversing requirements.

According to the present invention, these disadvantages are eliminated by the design of a novel, simple and inexpensive planetary gear drive incorporating independent output shafts for the right and left hand ground wheels, whereby the mechanism may be controlled to vary the speed and direction of rotation of these wheels to accomplish maneuverability of the machine. The planetary drive features a compact unit including a central casing containing all the planetary gearing. It is a further object of the invention to utilize the driving mechanism for driving other parts of the windrower.

Significant objects of the invention reside in new and improved control means for the planetary drive mechanism, including independent levers for the right and left hand sides of the mechanism, provision for automatically incurring the neutral status of the drive mechanism by manipulation of a single control member which simultaneously applies parking brakes to the machine, and by control means which is inter-related among the drive levers and brake means so as to render control of the machine simple and easy and without extensive instruction and attention.

The foregoing and other important objects and desirable features inherent in and encompassed by the invention will become apparent, as a preferred embodiment thereof is disclosed, by way of example, in the ensuing specification and accompanying sheets of drawings, the several figures of which are described immediately below:

Fig. 1 is a perspective of the machine as seen from the left hand side.

Fig. 2 is a transverse section through the planetary drive mechanism.

Fig. 3 is a perspective of the machine as seen from the rear and the right.

Fig. 4 is a plan of the drive and control mechanism.

Fig. 5 is a fragmentary enlarged view, partly in section, showing the releasable means for the park control means.

2

Fig. 6 is a fragmentary elevation, partly in section, substantially as would be seen along the line 6—6 of Fig. 4.

Fig. 7 is a similar view, as seen substantially along the line 7—7 of Fig. 4.

Fig. 8 is a companion view as seen substantially along the line 8—8 of Fig. 4.

Figs. 9, 10, and 11 are views similar respectively to Figs. 6, 7 and 8 but showing the drive positions of the several components.

As already indicated, the driving mechanism and control therefor is especially adapted for an agricultural machine of the windrower type. However, certain principles of the invention are otherwise applicable.

The windrower chosen for purposes of illustration comprises a longitudinal main frame 20 carried at its front end on right and left hand front ground wheels 22 and 24 and at its rear end on a castering tail wheel 26. The main frame carries a power plant, here an internal combustion engine 28 which, through means to be presently described, furnishes power for the propulsion of the machine as well as for the driving part of a harvesting unit, here a windrower platform 30. Control and operation of the machine are accomplished from an operator's station 32.

The forward end of the main frame 20 includes right and left hand forwardly extending supports 34 and 36 which, by means of suitable bearings on a transverse axis, such as indicated at 38 in Fig. 3, carry the platform or windrower means for vertical adjustment between raised and lowered positions. In the instance shown, raising and lowering of the platform is achieved by one or more hydraulic cylinder and piston assemblies, one of which appears at 40 in Fig. 3. The power plant 28 drives a suitable pump, not shown, and the cylinders 40 are controlled by a valve and valve lever arrangement such as that shown at 42 in Fig. 1.

The platform carries a typical harvester reel 44, which has its reel shaft 46 driven via a drive chain 48 from drive mechanism including intermediate chain and sprocket means 50 and a countershaft 52 which is journaled coaxially with the bearings 38 in the brackets 34 and 36. As best seen in Fig. 1, the countershaft furnishes drive, as via a pitman 54, to the harvester sickle (not shown). As seen in Fig. 3, the opposite end of the countershaft 52 operates via suitable belt and sheave means 56 to drive the platform canvas at that side of the platform. The canvas is not shown in the drawings. Similar belt and sheave means 58 (Fig. 1) are located at the opposite side of the platform and are driven by the countershaft 52 for driving the canvas at that side of the machine. The platform is of the type in which the canvases move inwardly toward the center of the machine to discharge the harvested material in a windrow centrally between the ground wheels 22 and 24. The tail wheel 26 is offset laterally to one side of the windrow so that it does not run over the windrow.

The driving mechanism is best shown in Fig. 2, wherein it will be seen that the planetary gear drive includes a central casing 60 made up of a center driving member 62 and right and left hand cages or supporting means 64 and 66 respectively. The center member 62 has a peripheral driving portion, here a belt groove 68, a central hub 70 and an intervening radial web 72 which interconnects the peripheral portion 68 and the hub 70. The web substantially divides the casing 60 into right and left hand halves. Each cage is of substantially bell shape and these cages respectively have external flanges 74 and 76 which are removably affixed by bolts 78 and dowels 80 respectively to opposite sides of the center member 62.

Right and left hand driven shafts 82 and 84 project respectively oppositely from the casing 60 and have outer end portions journaled on the main frame. The right hand end portion is journaled in bearings 86 and 88 respectively on the right hand support 34 and on the right hand side of the frame 20. The outer end of the left hand shaft 84 is journaled in similar bearings 90 and 92 on the left hand support 36 and an adjacent portion of the main frame 20. The inner ends of the shafts 82 and 84 are in end-to-end relationship and are journaled in the hub 70 of the central driving member 62 by means of appropriate bearings and hub portions on right and left hand driven sun gears 94 and 96.

A right hand reverse sleeve 98 is journaled on the right hand driven shaft 82 by appropriate bearings, as at 100, and this sleeve has keyed to its inner end next adjacent to the right hand driven sun gear 94 a right hand reverse sun gear 102. The outer end of the reverse sleeve has keyed thereto a brake drum 104.

A right hand forward sleeve 106 is journaled on the right hand reverse sleeve 98 and has fixed to its inner end, next adjacent to the right hand reverse sun gear 102, a right hand forward sun gear 108. The outer end of the forward sleeve 106 is short of the outer end of the reverse sleeve 98 and has keyed thereto a forward brake drum 110.

In addition to being journaled on the reverse sleeve 98, as by bearings, as at 112, the forward sleeve 106 is journaled in hub means 114 of the right hand cage 64. The feature of this arrangement, together with a similar arrangement at the opposite side of the casing, to be presently described, is that the coaxial driven shafts 82 and 84 are journaled on the main frame and the casing and sleeves are interjournaled on the shafts and among each other, providing for a simple and compact arrangement requiring no complicated bearing supports.

The left hand side of the mechanism is symmetrical with the right side as respects the median plane through the center driving member 62, and to this end includes left hand forward and reverse sleeves 116 and 118. The inner ends of these sleeves are respectively inside the cage 66 of the casing 60 and respectively have keyed thereto forward and reverse sun gears 120 and 122. The forward sleeve is journaled in a hub 124 of the left hand cage 66 and is also journaled, as at 126, on the reverse sleeve 118. The reverse sleeve is in turn journaled at 128 on the left hand driven shaft 84. The outer ends of the forward and reverse sleeves 116 and 118 have keyed thereto brake drums 130 and 132, respectively.

The outer end of the right hand driven shaft 82 extends to the right of the outboard bearing 86 and has keyed thereto a sprocket 134 by means of which a chain drive 136 is established to the right hand ground wheel 22. A similar drive is established between the left hand ground wheel 24 and the left hand driven shaft 84, via a sprocket 138 on the shaft 84 and a drive chain 140 between that sprocket and the wheel 24. Brake means for stopping or parking the vehicle are associated with the driven shafts 82 and 84. In the case of the former, the brake means includes a brake drum 142 and an encircling band 144. The left hand parking brake means includes a drum 146 keyed to the left hand driven shaft 84, which drum is encircled by a band 148. The control of these bands, as well as of bands 150, 152, 154, and 156, respectively for the drums 104, 110, 132 and 130, will be described below. Suffice it for the present to note that the several brake means 142—144, 104—150, 110—152, 146—148, 132—154 and 130—156, serve as means for controlling the planetary transmission and thereby provide the basic control for driving, reversing, steering and stopping the windrower.

The driving casing 60 is driven in the first instance by means of a belt 158 (Fig. 1) trained about the belt groove 68 in the casing and also about one of a pair of variable speed sheaves 160 and 162 (Fig. 3). The other sheave 162 is driven by a belt 164 from a sheave 166 on the engine 28. The speed of rotation of the casing 60 may be varied by altering the positions of the sheaves 160 and 162 relative to the sheaves 68 and 166, which in itself is a conventional arrangement. In the present instance, the distances between the respective sheaves are varied by means rockably supporting the sheaves 160 and 162, as on a swinging frame 168 (Fig. 3), the position of which is controlled by a speed control lever 170 positioned conveniently to the operator's station 32.

The platform countershaft 52 and the components connected thereto are driven directly from the engine by any suitable drive means not important here. Part of this drive means is fragmentarily illustrated as including a second engine drive sheave 172, a first belt 174, an intermediate belt 176 and an intermediate sheave 178 which is keyed to a transverse shaft 180. This shaft is in turn connected, as by a chain 182 (Fig. 1), to the countershaft 52.

The planetary drive mechanism is completed, as to basic structure, by right and left hand triple planet pinion clusters 184 and 186. Although one cluster is shown in each cage of the casing 60, it will be understood that several clusters can be provided in equal angularly spaced relationship about the central or rotating axis of the mechanism.

The planet pinion cluster 184 comprises three planet pinions 188, 190 and 192 which are respectively in mesh with the right hand driven sun gear 94, the right hand reverse sun gear 102 and the right hand forward sun gear 108. The cluster is keyed to a shaft 194 which is journaled at its inner end in boss means 196 in the web 72 of the center driving member 62 of the casing 60. The opposite end of the shaft is journaled in coaxial boss means 198 in the radial wall of the right hand cage 64. Suitable bearings are used at opposite ends of the shaft.

The left hand planet pinion 186 comprises three planet pinions 200, 202 and 204, keyed to a planet pinion cluster shaft 206 which is supported at its inner end in the previously described boss means 196 and at its outer end in boss means 208 in the radial wall of the left hand cage 66. The pinions 200, 202 and 204 are respectively in mesh with the left hand driven sun gear 96, the left hand reverse sun gear 122 and the left hand forward sun gear 120.

Since the pinions 188, 190 and 192 are formed integrally or are otherwise fixed to the shaft 194, as when formed separately, they will rotate in unison. The same is true of the pinions 200, 202 and 204; although the pinion shafts 194 and 206 are separate. The inner ends of the pinion cluster shafts 194 and 206 are axially withdrawable from the boss means 196 in the center member web 72. This is also true of the mounting of the hubs on the driven sun gears 94 and 96. Thus, either cage may be separated at 74—80 from the center member and the entire half unit moved outwardly. Since the construction is symmetrical, the same holds true for the other side of the casing. Thus, the arrangement provides a convenient method of assembly and disassembly of the unit for maintenance and repair. The feature of interjournaling the sleeves and driven shafts so as to rotatably support the casing, while the entire driving mechanism is simply supported on the main frame at the bearings 86, 88, 90 and 92, has already been elaborated.

From the description thus far, it will be seen that the driving mechanism establishes a forward-neutral-reverse drive means for operating the agricultural machine. The drive means includes the right hand reverse brake or control means 104—150, the right hand forward brake or control means 110—152, the left hand reverse brake or control means 132—154 and the left hand forward brake or control means 130—156. By selectively applying and releasing these brakes or control means, the operator is able to start, stop, steer and reverse the machine. The parking brake means 142—144 and 146—148 are also useful in stopping the machine as well as for holding the position of the machine on slopes. Normally, an agricultural machine travels at a relatively low rate and brake means such as those at 142—144 and 146—148 will be used only in emergencies, except for parking. Accordingly, reference to the brakes as parking brakes is descriptive only and is not intended to impart any limitations into the invention.

When the machine is standing idle, with the engine running and the casing 60 therefore driven, the resistance of the machine to forward travel will cause the driven shafts 82 and 84 to remain stationary. As long as none of the control brake means 104—150, 110—152, 132—154 or 130—156 is applied, the several drums 104, 110, 130 and 132 will rotate idly. Because of the difference in gear ratios among the various sun and planet gears, the driven sun gears 94 and 96 will remain stationary, the reverse sun gears 102 and 122 will rotate in the same direction as the casing 60 and the forward sun gears 108 and 120 will rotate in a reverse direction as respects the direction of rotation of the casing.

Now, if the right hand forward brake 110—152 is applied, the right hand forward sun gear 108 becomes stationary and drive is transmitted therefore to the right hand driven sun gear 94, rotating this sun gear forwardly at a reduced speed, because of the fact that the driven sun gear 94 is larger than the forward sun gear 108. Thus, only the right hand wheel 22 will be driven and the machine will move forwardly but will achieve a left hand turn. If the left hand forward brake means 130—156 is simultaneously applied, the left hand sun gear 96 will rotate forwardly and the machine will travel straight ahead. Steering to the right or left may be readily accomplished by selectively applying and releasing the right and left hand forward brake means 110—152 and 130—156, respectively. To reverse the machine, both right and left hand reverse brake means 104—150 and 132—154 are simultaneously applied, accompanied, of course, by simultaneous release of the forward brake means 110—152 and 130—156. This means that the reverse sun gears 102 and 122 will stand still and the driven sun gears 94 and 96 will be driven in reverse directions, because of the differences in diameters between the sun gears 94 and 102 and 96 and 122. Steering while driving in reverse may be achieved by selectively applying and releasing the right and left hand reverse brake means. As already indicated, the relatively slow travel speeds of an agricultural machine will normally suffice to enable stopping of the machine simply by simultaneously releasing all the control brake means. However, stopping is augmented by the control of the right and left hand parking brake means 142—144 and 146—148.

The coordination of the control of the six brake means by simple and convenient control means will now be described.

The main frame 20 includes at a forward portion thereof a transverse support, here a tube 210 which, in conjunction with other portions of the main frame, comprises basic supporting means for the several parts of the control mechanism and also provides means for anchoring one end of each of the brake bands 148, 154, 156, 152, 150 and 144. The other end of each band is appropriately connected to an operating member and, by coordinating the several operating members, the selective control of the transmission or driving means is achieved.

As best shown in Fig. 4, the tubular support 210 carries at opposite ends thereof right and left hand bearing brackets 212 and 214 which journal a parking brake operating member, here a solid rockshaft 216. This rockshaft has keyed to its opposite ends right and left hand brake operating arms 218 and 220, the former of which is connected to one end of the right hand parking brake band 144 and the latter of which is connected to the corresponding end of the left hand parking brake band 148. Opposite end of these bands are anchored to the cross tube 210, as at 222 and 224. The nature of the wrap of the band 148 about the drum 146 can be seen best in Fig. 6. The arrangement at the right hand side is similar, of course. A brake operating member, here in the form of a pedal 226, is keyed to an intermediate portion of the rockshaft 216 and is arranged so that depression of the pedal 226 rocks the rockshaft 216 in a counterclockwise direction to tighten or apply the parking brakes 146—148 and 142—144. Application of these two brakes is achieved simultaneously. A spring 228 connected between the pedal 226 and the support 210 (Figs. 6 and 9) serves as biasing means for biasing the pedal to its brake-release position.

The control for the right and left hand forward and reverse brake means includes in part a pair of operating members in the form of coaxial tubular rockshafts 230 and 232 journaled concentrically on and for rocking relative to the brake operating rockshafts 216. Right and and left hand control levers 234 and 236 are rigidly secured respectively to the drive control rockshafts 231 and 232. These levers are arranged conveniently proximate to each other for ready manipulation by an operator on the operator's station 32.

The left hand drive control rockshaft 232 has rigidly affixed thereto a pair of forwardly extending arms 238 and 240, the former of which is connected to the left hand reverse band 154 and the latter of which is connected to the left hand forward band 156. Although the arms 238 and 240 are side by side and project from the rockshaft 232 in the same angular relationship, the difference in the function thereof relative to the respective brake band is achieved by reversing the wrap of the bands. As seen in Fig. 7, the band 154 is connected at one end to the arm 238 and is wrapped in a clockwise direction about the drum 132, being anchored to the tubular support 210 at 242, whereas the wrap of the band 156 about the drum 130 is just the opposite, the band 156 being anchored at 244 to the support 210. Therefore, when the rockshaft 232 is rocked in a counterclockwise direction, for example (as seen in Figs. 6 through 11), the band 156 will be tightened on the drum 130 while the band 154 will be loosened as respects the drum 132. Of course, just the reverse is true. This arrangement therefore provides means whereby alternate control of the brake means 132—154 and 130—156 is made possible.

The same relationship exists at the opposite side of the control means, whereas the other drive control rockshaft 230 has affixed thereto a pair of forwardly extending arms 246 and 248 which are connected respectively to the bands 150 and 152. Here again, the wraps of the bands 150 and 152 about the drums 104 and 110 are reversed. The reversed anchoring of the bands to the support 210 is suggested at 250 and 252 (Fig. 4).

Up to this point, it has been established that the brake operating means 226—216—218—22 controls the parking brakes simultaneously, the pedal 226 being movable between a brake-apply position and a brake-release position, toward the latter of which it is biased by the spring 228. It is further clear that the drive control or forward-reverse levers 234 and 236 independently control the right and left hand sides of the forward-neutral-reverse drive means established by the planetary gearing in the casing 60. It is also apparent that the right hand forward-reverse lever 234, for example, simultaneously controls the right hand forward and reverse brake means 110—152 and 104—150, respectively, but the simultaneous control involves the application of one brake means and the release of the other. The same is true of the relationship of the left hand forward-reverse lever 236 and the left hand forward and reverse brake means 130—156 and 132—145. In the interests of convenience, the levers are arranged so that forward movement thereof achieves forward drive and reverse movement thereof achieves reverse drive, thus facilitating an understanding of the control mechanism by the operator of the machine and rendering the control natural and convenient.

In order that the control may be further simplified, the drive and brake control means are coordinated with each other and with park control means. As best seen in Fig. 4, this control means comprises a third rockshaft, hereinafter referred to as a park control rockshaft 254, suitably journaled on the tubular support 210 as by bearings 256. A park lever 258 is operatively connected to the outer or right hand end of the rockshaft 254. The connection may involve lost-motion means so that the lever 258 does not oscillate during normal operation of the machine, for reasons that will presently appear.

The park control lever 258 is capable of occupying two positions, one of which may be referred to as a "drive" position and the other of which may be considered as a "park" position. The arrangement is such that when the lever 258 is in its park position, the brakes 142—144 and 146—148 are simultaneously applied. The park lever 258 is releasably retained in its park position by releasable means comprising a resilient member 260 secured at its bottom at 262 to a platform portion 264 of the operator's station 32. As best seen in Fig. 5, the outer surface of the resilient member 260 is outwardly inclined so that as the parking lever 258 is moved rearwardly, it may cam past the member 260 and the member will then spring out in front of the lever to hold the lever releasably in its rear or park position. The member 260 may be manually pressed inwardly to permit forward movement of the lever 258 to its drive position. The park position of the lever 258 is shown in Fig. 8 and the drive position thereof is shown in Fig. 11.

The park rockshaft 254 has rigidly secured to an intermediate portion thereof a brake control arm 266 and this arm is connected by a brake control link 268 to the brake pedal 226, the connections being of course pivotal. The structural and functional relationship of the components may be seen best in Figs. 6 and 9. In Fig. 6, the park rockshaft 254 is in its part position and the arm 266 thereon has been swung forwardly and upwardly to exert a forward force on the brake pedal 226 through the link 266, depressing the pedal against the bias of its spring 228 and tightening the bands 148 and 144 respectively about the parking brake drums 146 and 142. As will be brought out below, the park rockshaft is held against rearward movement beyond the position shown in Fig. 6 and the over-center relationship at the pivotal connection 270 between the arm 266 and the link 268 locks the brake pedal in its brake-applying position. When the park lever is moved forwardly to its drive position, the rockshaft 254 is rotated in a counterclockwise direction, and the arm 266 swings downwardly and rearwardly (Fig. 9) and the brake return spring 228 returns the pedal 226 to its brake-release position. A stop on upward travel of the brake pedal 226 is established because the arm 266, in moving to its Fig. 9 position, engages an upper portion of the transverse tubular support 210 and the link 268 is now in compression to complete the limit or stop means. In brief, movement of the park lever 258 between its park and drive positions respectively incurs the brake-apply and brake-release positions of the parking brakes. As referred to above, the use of a lost-motion connection between the park rockshaft 254 and the park lever 258 eliminates possible undesirable oscillation of the park lever in its drive position when the brake pedal 226 is depressed and released by the foot of the operator on the machine.

A further aspect of the control and drive mechanism is the biasing of the drive control levers 234 and 236 to forward drive positions. For this purpose, the support 210 carries a depending bracket 272 and the levers 236 and 234 are connected to this bracket by spring loaded links 274 and 276. In conjunction with this arrangement, the park control means is utilized, in its park position, to retract the drive control levers 234 and 236 to their neutral positions, which lie intermediate their forward and reverse positions, the relative locations of which will be clear from Figs. 7, 8, 10 and 11.

The park rockshaft 254 has rigidly secured thereto substantially and respectively in alinement with the drive control levers 234 and 236 a pair of rearwardly extending arms 278 and 280. As best shown in Fig. 7, these arms extend downwardly and rearwardly when the rockshaft 254 is in its park position. The arms are connected respectively to the levers 234 and 236 by control or retract links 282 and 284.

The details of the left hand link 284 best appear in Figs. 7 and 10 and that link will be described, it being understood that the right hand link 282 is identical.

The retract link 284 is pivotally connected at its rear end at 286 to the retract arm 280 and has at its front end a connection including a lost-motion device made up by a slot 288 in the link and a pin or follower 290 carried by the lever 296. As a matter of design, the pin 290 also serves as a connecting point for the left hand spring-loaded link 276. In view of the over-center relationship among the arm 280, link 284 and pivotal connection 290, the link 284 is notched or cut out at 292 to accommodate the park rockshaft 254, since this link, in the Fig. 7 position, traverses the rockshaft.

When the rockshaft is in its park position, the arm 280, as previously described, inclines downwardly and rearwardly, and the length of the link 284 as measured between the pivotal connection 286 and the forward end of the slot 288 establishes the neutral position of the lever 236, since, when the arm 280 is rocked to the Fig. 7 position, it retracts the lever 236 to its neutral position. When the park control lever 258, and consequently the park rockshaft 254, are rocked forwardly to their drive position, the arm 280 on the rockshaft 254 swings upwardly and forwardly, releasing the over-center lock and the lock established because of the reception of the rockshaft 254 in the notch 292, whereby the spring load in the link 276 moves the control lever 236 forwardly to its forward position. In this condition of the parts (Fig. 10), the pin 290 on the lever 236 is free to move back and forth in the link slot 288 so that the lever may move among its forward, neutral and reverse positions.

From the description thus far, it will be seen that when the park lever 258 is moved from its drive to its park position, it causes clockwise rocking of the park on the inner end of the rockshaft 254 exerts a forward rockshaft 254. Two results follow: the brake arm 266 force through the link 268 to apply the parking brakes; the downwardly swinging retract arm 280 exerts a rearward force on the link 284 which is transmitted to the control lever 236, and the lever 236 is returned to its neutral position. As already indicated, the construction of the links 282 and 284 is identical and its follows therefore that the right hand drive control lever 234 will be returned to its neutral position along with the return of the lever 236 to its neutral position.

A novel feature of the arrangement as best depicted in Fig. 7 resides in the interlock established between the retract arm 280 and the retract link 284. That interlock prevents further clockwise rocking of the rockshaft 254 and therefore affords a rear stop for the park control lever. This occurs because the notched portion 292 of the link 284 engages the park rockshaft 254 from above. Consequently further downward movement of the retract arm 280 cannot occur without tending to rock the forward end of the link 284 upwardly, which is prevented because the pin 290 in the lever 236 is now at the forward end of the slot.

It will be noted on the basis of Fig. 7 alone that although the lever 236 has been retracted to its neutral position, it appears that it is still possible to shift the lever rearwardly to its reverse position because of the extension of the slot 288 rearwardly of the pin 290. However, this possibility is prevented by the utilization of a stop link 294 which is pivotally interconnected between the previously described brake arm 266 and the pin 290 on the lever 236. This is best shown in Fig. 8, wherein it will also be seen that the link 290 is slotted at 296, and the slot in the park position of the link receives the pin or follower 290 at its rear end, thus preventing movement of the lever from its neutral to its reverse position. Engagement of the lever pin 290 with the forward end of the slot 288 in the link 284 prevents movement of the lever 236 forwardly from its neutral position when the park control means is in its park position. Thus, the lever 236 is confined in its neutral position as long as the park means is in its park position.

A similar stop link 298 is provided between the right hand control lever 234 and a stop link arm 300 rigidly secured to the park rockshaft 254.

In the evaluation of Figs. 6, 7, and 8, for example, it should be borne in mind that although these views have been referred to respectively as sections substantially on the lines 6—6, 7—7 and 8—8 of Fig. 4, only so much of the structure has been shown in each figure as is pertinent to the control of the particular brake means. This liberty has been taken in the interests of clarifying the construction. Another way of looking at Figs. 6, 7 and 8 is to superimpose Fig. 7 on Fig. 8 and to superimpose Fig. 6 on Figs. 7 and 8, which will place the several views in coaxiality, which would be the actual appearance of the arrangement. However, in the separation of the views for the reasons indicated above, it is necessary to repeat the lever 236 in Fig. 8 in dot-dash lines; although, it will be understood that it is the same lever that appears in Fig. 7. The type of illustration, however, does have the advantage of illustrating the two control arms 238 and 240 respectively for the brake bands 154 and 156, and further clarifies the relationship of the retract link 284 and stop link 294 between the park control means and the drive control lever 236. The same exists with respect to Figs. 9, 10 and 11.

*Operation*

The details of the operation have been outlined above, but a brief summary may be in order.

As already indicated, the park control means in its park position applies the parking brakes and therefore prevents forward or reverse movement of the machine. Simultaneously with the application of the parking brakes, the control levers 234 and 236 are retained in their neutral positions and the forward and reverse drive means for the planetary gearing are neutralized. Consequently, the casing rotates idly, as do the planet pinion clusters and the drums 104, 110, 130 and 132.

Straight ahead forward travel will be achieved as soon as the park control means is moved to its drive position, because it follows that the parking brakes will be released and the control levers 234 and 236 will move under their spring loads to their forward positions, assuming that the speed and output of the engine 28 are presently adequate. In any event, the engine throttle and the variable speed drive means at 162—168 are adjusted by the lever 170 to achieve the desired forward ground speed. Steering of the machine may be accomplished by varying the application of the right and left hand control means. Reverse drive may be effected by moving the levers 234 and 236 simultaneously to their reverse positions which, as already described, simultaneously releases the forward brake bands 152 and 156 and applies the reverse brake bands 150 and 154. Steering in reverse follows from selective manipulation of the levers 234 and 236.

Braking may be accomplished at any time by depressing the brake pedal 226, since when the park means is in its drive position, it has no interlock on the brake pedal. Likewise, the levers 234 and 236 are free to move fore-and-aft among their forward, neutral and reverse positions, because of the slots (288 in the link 284) in the retract links. The slot 296 in the stop link 294 likewise does not interfere with movement of the lever 236 among its forward, neutral and reverse positions.

The same is true of the right hand lever 234 and its stop link 298.

Limit on forward movement of the lever 236 to its forward position is established by engagement of the lever pin 290 with the forward end of the retract link slot 288, since the park rockshaft 254 cannot rotate farther forwardly from its Fig. 10 position because, as shown in Fig. 9, the brake arm 266 is in engagement with the top of the tubular support 210.

The stop link 294 in the drive position of the park control means establishes a limit on movement of the lever 236 to its rearward or reverse position, for the reasons already outlined; that is, the arm 266 on the park rockshaft 254, in the park position of that rockshaft, engages the tubular member 210.

Features other than those categorically enumerated, as well as variations in the preferred structure illustrated, will readily occur to those versed in the art, all of which may be achieved without departure from the spirit and scope of the invention.

What is claimed is:

1. In power-transmission mechanism including forward-neutral-reverse drive means and a brake, control mechanism comprising: a support; brake-operating means connected to the brake and movable on the support between brake-applying brake-release positions; drive control means connected to the drive means and movable on the support selectively in opposite directions from a neutral position incurring the neutral status of the drive means to forward and reverse positions respectively incurring forward and reverse drive of said drive means; park control means movable on the support between park and drive positions; first connecting means interconnecting the brake-operating means and the park control means for incurring the brake-apply and brake-release positions of the former respectively in accordance with the park and drive positions of the latter; second connecting means connected between the drive control means and the park control means for incurring the neutral position of the former in accordance with the park position of the latter, said second connecting means including a lost-motion device enabling movement of the drive control means among its forward, neutral and reverse positions when the park control means is in its drive position.

2. The invention defined in claim 1, including: releasable means for selectively locking the park control means in and releasing said member from its park position.

3. The invention defined in claim 1, including: stop means operative incident to movement of the park control means to its park position to engage the drive control means for preventing movement of said drive control means to its reverse position.

4. The invention defined in claim 1, including; means biasing the brake-operating means to its brake-release position and acting through the first connecting means to bias the park control means to its park position; and releasable means for selectively locking the park control means in and releasing same from its park position.

5. The invention defined in claim 1, in which: the brake-applying means and the drive control means respectively include concentric rockshafts and the park control means includes a rockshaft parallel to said concentric rockshafts.

6. The invention defined in claim 5, in which: the brake-operating means further includes a brake-operating lever on one of said concentric rockshafts; the drive control means further includes a drive control lever on the other concentric rockshaft; the park control means includes first and second arms on the park control rockshaft; the first connecting means includes a first link connecting the first arm to the brake control lever; the second connecting means includes a second link connecting the second arm to the drive control lever; and the lost-motion device comprises a slot in said second link and a slot follower on the drive control lever.

7. The invention defined in claim 5, in which: the brake-operating means further includes a brake-operating lever on one of said concentric rockshafts; the drive control means further includes a drive control lever on the other concentric rockshaft; the park control means includes first and second arms on the park control rockshaft; the first connecting means includes a first link connecting the first arm to the brake control lever; the second connecting means includes a second link connecting the second arm to the drive control lever and the second arm and second link are arranged to occupy an over-center relationship as respects the park control rockshaft when the park control means is in its park position.

8. The invention defined in claim 7, in which: the second link traverses the park control rockshaft in said over-center relationship and said second link is notched to accommodate said park control rockshaft.

9. In power-transmission mechanism including forward-neutral-reverse drive means, control mechanism comprising: a support; drive control means connected to the drive means and movable on the support selectively in opposite directions from a neutral position incurring the neutral status of the drive means to forward and reverse positions respectively incurring forward and reverse drive of said drive means; park control means movable on the support between park and drive positions; connecting means connected between the drive control means and the park control means for incurring the neutral position of the former in accordance with the park position of the latter, said connecting means including a lost-motion device enabling movement of the drive control means among its forward, neutral and reverse positions when the park control means is in its drive position.

10. The invention defined in claim 9, including: means biasing the drive control means to its drive position; and the lost-motion device includes a pick-up portion engaging the drive control means for moving same to its neutral position upon movement of the park control means to its park position.

11. In power-transmission mechanism including forward-neutral-reverse drive means, control mechanism comprising: a support; a drive control member rockable on the support for movement selectively in opposite directions from a neutral position incurring the neutral status of the drive means to forward and reverse positions respectively incurring forward and reverse drive of said drive means; a rockshaft carried by the support for movement between first and second positions; an arm fixed to the rockshaft; and a link pivotally connected at one end to the arm and having its other end adjacent to the drive control member, said other end having a slot therein and said member having a follower received in said slot, said slot being of such length that when the rockshaft is in its first position the follower is free to move lengthwise of the slot to enable movement of the member among its forward, neutral and reverse positions and when the rockshaft is moved to its second position one end of the slot picks up the member via the follower and moves said member to its neutral position.

12. The invention defined in claim 11, in which the arm and link are arranged to occupy an over-center relationship as respects the rockshaft when said rockshaft is moved to its second position.

13. The invention defined in claim 11, including: a stop controlled by the rockshaft and effective in the second position thereof to engage the member for preventing said member from moving to its reverse position whereby said member in the second position of the rockshaft is confined to its neutral position between said stop and said one end of the link slot.

No references cited.